P. D. McAULIFFE.
CLAMP.
APPLICATION FILED JULY 7, 1910.
994,768.
Patented June 13, 1911.
*Fig. 1.*
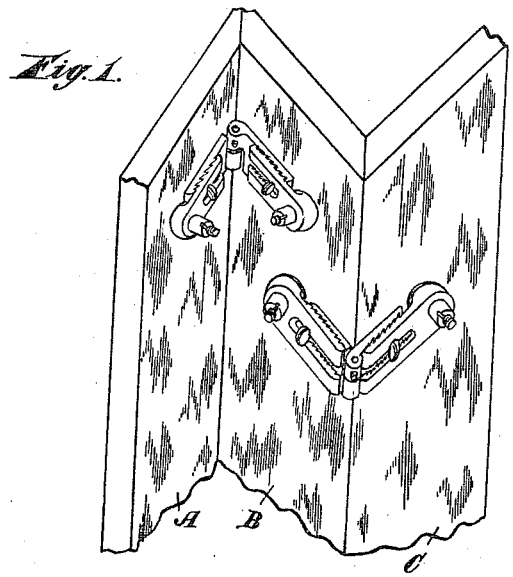
*Fig. 2.*
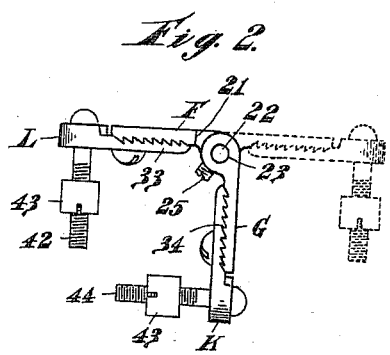
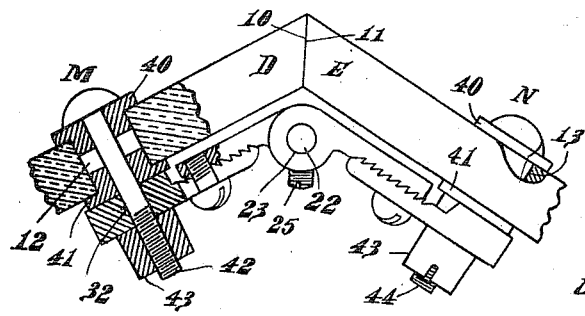
*Fig. 4.*
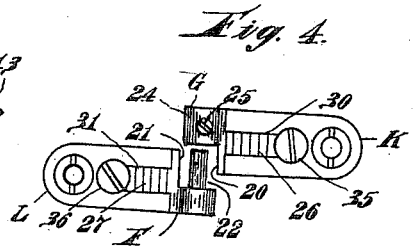
*Fig. 3.*
*Fig. 5.*
*Fig. 7.*
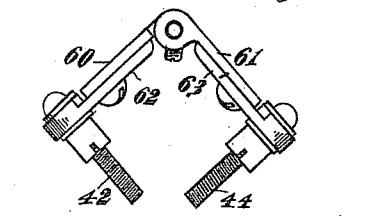
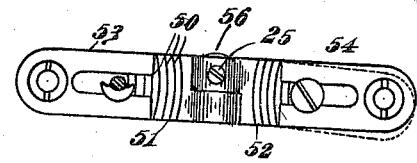
*Fig. 6.*
WITNESSES:
Ludger A. Nicol
Fisher H. Pearson
INVENTOR.
Patrick D. McAuliffe
BY
Gardner W. Eason
ATTORNEY.

UNITED STATES PATENT OFFICE.

PATRICK D. McAULIFFE, OF LOWELL, MASSACHUSETTS.

CLAMP.

994,768.

Specification of Letters Patent. Patented June 13, 1911.

Application filed July 7, 1910. Serial No. 570,854.

*To all whom it may concern:*

Be it known that I, PATRICK D. McAULIFFE, a citizen of Great Britain, residing at Lowell, in the county of Middlesex and State of Massachusetts, have invented certain new and useful Improvements in Clamps, of which the following is a specification.

My invention relates to fastening devices for joining the edges of plates or sheets and more particularly for such devices for securing the edges of plate glass or other panes of glass. While it is especially useful for connecting plates of brittle material such as glass, it may be used to advantage in connection with other materials.

In putting together show cases or show windows, it is desirable that the sash or bead which was formerly used to join the edges of the abutting glass plates should be eliminated. In place thereof, it is now common to use some form of clamp which is strong and at the same time inconspicuous. It is desirable that such clamps should be capable of joining two plates at any angle and that when joined, the plates should be held firmly together. Series of holes through which clamp bolts can be passed are usually drilled proximate each other in each adjoining plate. It is very difficult to drill these holes so as to register exactly with the bolt. It is therefore desirable to make the bolt laterally adjustable. If this is done however by means of a slot and friction screw, the enormous weight of the plate glass will overcome the friction of the screw head and draw the members apart. A positive adjustable connection is therefore desirable. It frequently happens that on account of the weakness of the frame, a plate of glass will drop or sag a certain extent after being set and if there is no give to the clamp, such dropping or sagging will crack the glass. I aim to overcome this difficulty also.

My invention is shown in the accompanying drawings in which—

Figure 1 is a perspective view of plates of glass put together at different angles, those on the left being at an acute angle, and those on the right at a reversed acute angle. Fig. 2 is a top view of my clamp alone. Fig. 3 is a top view of the clamp in place joining plates at an obtuse angle, parts being shown in section. Fig. 4 is a front view of the two members of my clamp separated. Fig. 5 is a perspective view of one of the washers. Fig. 6 shows a modification and Fig. 7 another modification of my device.

A, B, C, D and E represent plates of glass. These are usually beveled at their adjoining edges as shown at 10 and 11, Fig. 3, so as to make a tight joint. Holes 12 and 13 are drilled through these plates such as D and E near their beveled edges.

My clamp consists of two leaves F and G which are pivoted together as shown. They are cut away at 20 and 21 and while F carries integral therewith, a pivot pin 22, G is swelled at 24 and the swelled portion is pierced with a pivot pin hole 23 for pin 22. Thereby F and G are pivoted together and on account of the cut away portions 20 and 21, they can be swung in an arc of much more than 180 degrees as shown in the right hand clamp in Fig. 1. The dotted lines in Fig. 2, show the leaves extended in a straight line. To keep the pivoted leaves F and G from separating and to permit them to be clamped in any position, I use a set screw 25 which passes through the swelled portion 24 of leaf G to hole 23 so as to bear against pin 22 when the parts are together. Thereby, the leaves F and G can be turned to any angle within 270 degrees or thereabout and then locked in that position. Pin 22 may be headed as shown at 56 in Fig. 6 or it may be without a head as shown in Fig. 4. Preferably on the inner faces of F and G, I form transverse teeth 26 and 27. The other members of my clamp are the slides K and L. Each of these has an open longitudinal slot 30 or 31 and near its end has a bolt hole 32. Each has on its face adjoining the teeth on leaves F and G, teeth 33 or 34. I prefer to have the teeth 26 and 27 rake toward the pivot and teeth 33 and 34 rake away therefrom in such a way that when once the teeth engage each other, there will be no possibility of their giving or sliding over each other longitudinally of the leaves and slides. They can slide transversely thereof however.

Parts G and K are held together by a headed screw 35 and parts L and F by a headed screw 36 each of which passes through a slot 30 or 31 and into leaf G or F respectively. I prefer to make the shanks of these screws 35 and 36 somewhat smaller in diameter than the width of slots 30 and 31 through which they pass to allow a slight transverse play of the parts in case either plate of glass begins to sag.

By reason of the play between clamping screws 35, 36 and open adjusting slots 30, 31, there can be a slight transverse play between the adjoining leaf and slide which is not prevented by the clamping teeth, but there is no chance of any longitudinal play or yielding as such play is prevented by the teeth. These teeth relieve the strain upon clamping screws 35 and 36 almost entirely.

Through each hole 32, I pass a connecting bolt M or N with preferably a round smooth head. The shanks of these bolts M or N are preferably smaller than holes 12 and 13 in the glass, the intervening space being filled by rimmed lead washers 40 and 41. These washers are pierced to fit the shank 42 and 44 of bolts M or N and are of a size to fit comfortably in holes 12 or 13. They are preferably rimmed to extend a short distance over the glass outside of the holes. Nuts 43 screw upon shanks 42 and 44 and bear against members K and L respectively and bind the parts in place.

As the washers 40 and 41 are inserted on both sides of holes 12 and 13 and as they project therefrom, they entirely prevent any direct contact between the metal of the clamp and the glass, thereby avoiding any danger of splintering. I prefer to make these washers of lead because it will not injure the glass, as steel or hard metal will, and lead is as tight as, and much more durable than rubber. These lead washers, when the nuts 43 are tightened, make a water tight joint which will never wear out or decay.

I prefer to make the threads of the shank 42 of bolt M which passes through the left hand slidable member right handed and of shank 44 of bolt N which passes through the right hand slidable member left handed. Thereby, in case either D or E drops away from the other, the tendency will be to loosen this bolt rather than to tighten it. This will ease up rather than increase the tension, thereby avoiding splintering or cracking the glass.

The construction shown in Fig. 6 is the same as just described, except that the teeth 50 on the adjoining faces of the pivoted members 51 and 52 and the slidable members 53 and 54 are cut on the arc of a circle. Thereby, if one plate sags, members 53 and 54 can more readily slide down as indicated by the dotted lines in Fig. 6 as the teeth can more readily slide past each other. Fig. 7 shows pivoted members 60 and 61 and slidable members 62 and 63 with plain faces. This plain construction makes the sliding action just referred to still easier. The shank 42 has a right hand thread and the shank 44 a left hand thread.

I prefer to make the slots 30 and 31 open, so that by loosening the clamping screws 35 or 36, the slidable members can be adjusted or removed entirely without entirely removing said screws.

The main feature of my invention are the pivot set screw 25 which permits the device to be accurately adjusted to the angle of the adjoining plates of glass; the slight clearance between the slots in the slidable member and the clamping screws, together with the transverse teeth whereby the glass plates are held rigidly together in a longitudinal direction, and the frictional strain on the clamping screws is eliminated, while the glass plates can give transversely of the clamps to a sufficient extent to avoid breaking the glass; together with the right hand threads on one connecting bolt M and left hand threads on the other connecting bolt N. The open slot in the slidable members is also an advantage and the rimmed lead washers make an all metallic construction which is practically indestructible and which will yield only in the direction where yielding is desirable. If teeth are not used as shown in Fig. 7, the weight of the glass is likely to overcome the friction of the clamping screws 35 or 36 and eventually separate the parts. This construction is not objectionable on light show-case work, but is not satisfactory with heavy plates.

What I claim as my invention and desire to cover by Letters Patent is:

1. In a clamp for plates of brittle material, the combination of a leaf member having a pivot pin, and another leaf member having a hole for said pivot pin, with a set screw which passes through the last named member and bears on the pivot pin, and means for attaching each of said leaf members to an adjoining plate.

2. In a clamp for connecting plates of brittle material, the combination of a leaf which has transverse teeth and a pivot pin, with another leaf having transverse teeth and a pivot pin hole, and a set screw which passes through the last named leaf into the pivot pin hole, together with slidable members each of which has transverse teeth which register with the teeth on said leaves and each of which has a longitudinal slot, clamping screws whose shanks are smaller than the width of the slots and which pass through the slots into the leaves, together with means for attaching the slidable members to adjoining plates.

3. In a clamp for connecting plates of brittle material, the combination of a leaf which has transverse teeth and a pivot pin, with another leaf having transverse teeth and a pivot pin hole, and a set screw which passes through the last named leaf into the pivot pin hole, together with slidable members each of which has transverse teeth which register with the teeth on said leaves and each of which has an open longitudinal slot at its inner end, clamping screws whose shanks are smaller than the width of the slots and which pass through the slots into the leaves, together with means for attaching the slidable members to adjoining plates.

4. In a clamp for connecting plates of brittle material, the combination of a leaf which has transverse teeth and a pivot pin, with another leaf having transverse teeth and a pivot pin hole, and a set screw which passes through the last named leaf into the pivot pin hole, together with slidable members each of which has transverse teeth which register with the teeth on said leaves and each of which has a bolt hole near its outer end and an open longitudinal slot at its inner end, clamping screws whose shanks are smaller than the width of the slots which pass through the slots into the leaves, together with bolts which pass through the bolt holes, and two rimmed lead washers carried by each bolt, and nuts therefor as described.

5. In a clamp, the combination of a leaf which has a pivot pin, with another leaf which has a pivot pin hole, and a set screw which passes through the last named leaf into the pivot pin hole, together with a member so attached to each leaf as to be capable of transverse movement thereon and having a bolt hole near its outer end, a bolt which passes through the bolt hole in the left hand member and having a right hand thread, a nut therefor, a bolt which passes through the bolt hole in the right hand member and having a left hand thread, and a nut therefor as described.

In testimony whereof I hereto affix my signature in presence of two witnesses.

PATRICK D. McAULIFFE.

Witnesses:
GARDNER W. PEARSON,
LUDGER A. NICOL.

Copies of this patent may be obtained for five cents each, by addressing the "Commissioner of Patents, Washington, D. C."